United States Patent Office 3,549,623
Patented Dec. 22, 1970

---

3,549,623
7-$R_1$-1-($R_2$)-3-HYDROXY-5-PHENYL-1H-1,4-BENZODIAZEPIN-2(3H)-ONE
Robert M. Novack, Mendham, N.J., assignor to Warner-Lambert Pharmaceutical Company, Morris Plains, N.J., a corporation of Delaware
No Drawing. Filed Nov. 14, 1968, Ser. No. 775,937
Int. Cl. C07d 53/06
U.S. Cl. 260—239.3                                      3 Claims

ABSTRACT OF THE DISCLOSURE

The present invention relates to a novel class of 1,4-benzodiazepines of the formula:

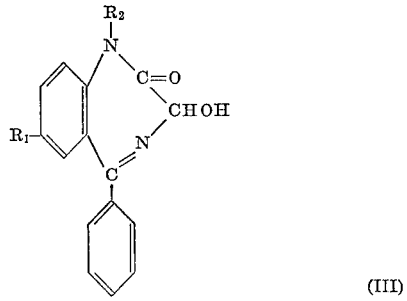

(III)

wherein $R_1$ is hydrogen, halogen, lower alkyl, lower alkoxy, nitro and the like; and $R_2$ is a cycloalkylmethyl group. These compounds are prepared by treating 7-$R_1$-1-($R_2$)-5-phenyl-1H-1,4-benzodiazepin-2(3H)-one with acetic acid and peracetic acid to obtain its corresponding N-oxide, treating the N-oxide thus obtained with acetic anhydride to obtain the corresponding 3-acetoxy derivative followed by treating the 3-acetoxy derivative with a base. These compounds are useful as muscle relaxants. In addition, these compounds are useful as bronchodilators, as demonstrated in histamine and serotonin induced lung constriction.

---

The present invention relates to a novel class of 1,4-benzodiazepines; and more particularly, the present invention relates to a novel class of 7-chloro-1-(cyclopropylmethyl)-3-hydroxy-5-phenyl - 1H - 1,4 - benzodiazepin-2-(3H)-ones having the following structural formula:

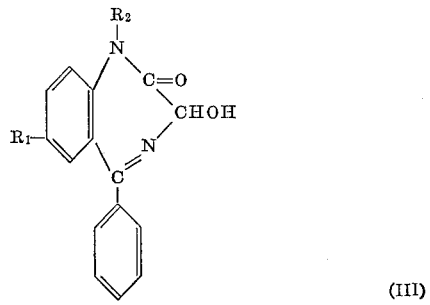

(III)

wherein $R_1$ is hydrogen; halogen, i.e. chlorine, bromine, fluorine, iodine; lower alkyl of 1 to 6 carbon atoms, such as methyl, ethyl, propyl, isopropyl, butyl, isobutyl, and the like; lower alkoxy of from 1 to 6 carbon atoms, such as methoxy, ethoxy, propoxy, isopropoxy and the like; and nitro; and $R_2$ is a cycloalkylmethyl group, in which cycloalkyl is from 3 to 8 carbon atoms, such as cyclopropylmethyl, cyclopentylmethyl and the like.

The present invention also includes within its scope a novel process for the production of the above compounds, as well as intermediates useful for their production.

The compounds of this invention are useful as tranquilizers. They may be used, for example, in accordance with the teachings set forth in U.S. Pat. No. 3,192,200. Generally speaking, these compounds are useful in relieving anxiety, tension, and apprehension. The usual dose for treating such conditions is within the range of 5 to 25 mg., three to four times daily.

In addition to the tranquilizing properties of these compounds, these compounds also possess potent bronchodilator effects, for example, in histamine and serotonin induced lung constrictions in mammalian hosts, such as guinea pigs, dogs, cats, and the like. The compounds are capable of dilating the bronchial tubes at a dose of 1 to 20 mg./kg., preferably 10 mg./kg. Accordingly, these compounds are useful in manifestations resulting from bronchial spasms, such as for example, asthma, emphysema, and the like. Generally speaking, a dose regimen of 1 to 20 mg./kg., preferably 10 mg./kg., is prescribed to produce the bronchodilator effects.

In order to use these compounds, they are combined with an inert pharmaceutical carrier, such as lactose, mannitol, terra-aba and the like, to form dosage forms, such as tablets, capsules, and the like. They may also be combined with parenterally acceptable vehicles such as water for injection, arachis oil, and the like, to form dosage forms suitable for parenteral administration. They may also be combined with other inert pharmaceutical carriers, such as cocoa butter, polyethylene glycol base, to form dosage forms suitable for rectal administration. These dosage forms, such as tablets, suppositories, injections, are compounded by methods well known to the pharmacist's art.

In order to enhance the therapeutic spectrum of these compounds, they may be combined with other therapeutically known agents, such as organic nitrate esters, pentaerythritol trinitrate (PETRIN) and pentaerythritol tetranitrate (PETN), β-adrenergic blocking agents, such as 3,4-dihydronaphthalenoneoxy-2-hydroxy-propylamines, analgesic agents, such as aspirin, other bronchodilators, such as theophylline. These dosage forms as well as the combination with other known therapeutic agents are also a feature of this invention.

According to the process of this invention, these compounds are prepared by treating 7-$R_1$-1-($R_2$)-5-phenyl-1H-1,4-benzodiazepin-2(3H)-one with acetic acid and peracetic acid at a temperature of about 90° to 100° C. over an extended period, such as from 10 to 16 hours. This reaction yields the corresponding N-oxide of the formula:

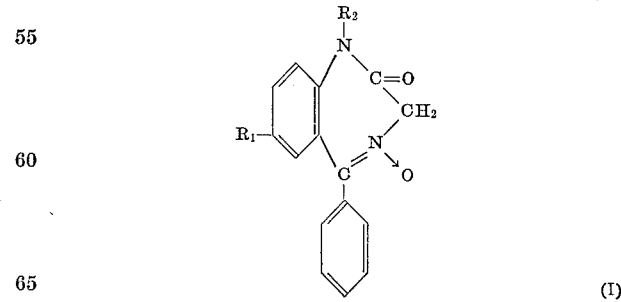

(I)

The intermediate thus obtained is treated with acetic anhydride to yield the corresponding 3-acetoxy derivative of the formula:

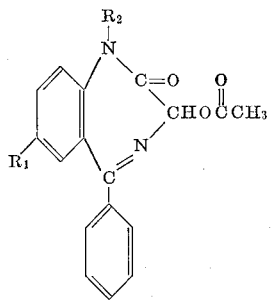

The acetoxy derivative II is then treated with a base, such as an alkali metal hydroxide or ammonium hydroxide, at a temperature of 20° to 30° C. The reaction mixture is then acidified, for example, with acetic acid. The desired product is recovered in the form of a precipitate and can be removed by filtration techniques.

The starting compound, namely, 7-$R_1$-1-($R_2$)-5-phenyl-1H-1,4-benzodiazepin-2(3H)-one is a known compound and can be produced in accordance with the teachings set forth in U.S. Pat. No. 3,192,200.

The following examples are included in order further to illustrate the invention.

EXAMPLE I 7-chloro-1-(cyclopropylmethyl)-5-phenyl-1H-1,4-benzodiazepin-2(3H)-one-4-oxide A solution of 7-chloro-1-(cyclopropylmethyl)-5-phenyl-1H-1,4-benzodiazepin-2(3H)-one, 70.0 g. (0.216 M); acetic acid, 1.5 liter; and 40% peracetic acid, 60 cc.; was heated at 90°–95° C. for 16 hours. To this was added 12 liters of water and neutralization was effected by the addition of 1.44 kg. of sodium carbonate. The mixture was extracted with 2-liters and 1-liter portions of chloroform. The chloroform extracts were combined and dried with magnesium sulfate. The drying agent was removed by filtration and the filtrate concentrated to a 80.0 g. residue. This residue was recrystallized successively from 240 cc. and 300 cc. of isopropanol. There resulted 56.0 g. (76.2%) of pure 7-chloro-1-(cyclopropylmethyl) - 5-phenyl - 1H-1,4-benzodiazepin-2(3H)-one-4-oxide; M.P. 152.5–154.5° C.

EXAMPLE II 3-acetoxy-7-chloro-1-(cyclopropylmethyl)-5-phenyl-1H-1,4-benzodiazepin-2(3H)-one A solution of 7-chloro-1-(cyclopropylmethyl)-5-phenyl-1H-1,4-benzodiazepin-2(3H)-one-4-oxide, 55.5 g. (0.163 M) and acetic anhydride, 555 cc., was heated at 90°–95° C. for one-half hour. The reaction solution was concentrated to a residue. This residue was recrystallized from 1 liter of isopropanol to yield 53.0 g. (85.3%) of 3-acetoxy-7-chloro-1-(cyclopropylmethyl) - 5 - phenyl - 1H - 1,4-benzodiazepin-2(3H)-one; M.P. 195–197° C.

EXAMPLE III 7-chloro-1-(cyclopropylmethyl)-3-hydroxy-5-phenyl-1H-1,4-benzodiazepin-2(3H)-one To a suspension of 3-acetoxy-7-chloro-1-(cyclopropylmethyl)-5-phenyl-1H-1,4-benzodiazepin-2(3H) - one, 15.3 g. (0.04 M) in absolute ethanol, 200 cc., was added a solution of sodium hydroxide, 1.6 g. (0.04 M), in water, 90 cc., dropwise over a 15-minute period at 25° C. The reaction mixture was stirred for one hour and diluted with 400 cc. of water. Acidification was effected with acetic acid. The mixture was cooled and crude product isolated by filtration. There resulted 13.0 g. (96.3%); M.P. 157.5–161° C. This was recrystallized successively from acetonitrile, 50 cc., and 95% ethanol, 105 cc. There resulted 7.5 g. (55.5%) of pure 7-chloro-1-(cyclopropylmethyl) - 3-hydroxy-5-phenyl - 1H - 1,4 - benzodiazepin-2(3H)-one; M.P. 158.5–160.5° C.

It is understood that the foregoing detailed description is given merely by way of illustration and that many variations may be made therein without departing from the spirit of my invention.

Haivng described my invention, what I desire to secure by Letters Patent is:

1. A compound of the formula:

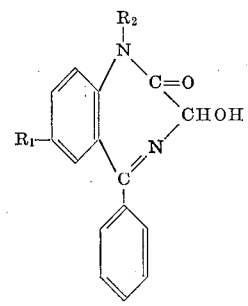

wherein $R_1$ is hydrogen, halogen, lower alkyl, lower alkoxy or nitro; and $R_2$ is cycloalkylmethyl, wherein the cycloalkyl ring has from 3 to 8 carbon atoms.

2. A compound according to claim 1 wherein $R_1$ is chloro and $R_2$ is cyclopropylmethyl.

3. A compound of the formula:

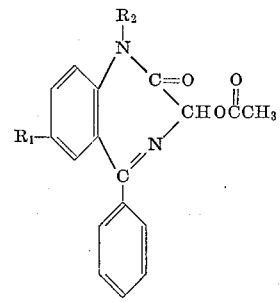

wherein $R_1$ is hydrogen, halogen, lower alkyl, lower alkoxy or nitro; and $R_2$ is cycloalkylmethyl, wherein the cycloalkyl ring has from 3 to 8 carbon atoms.

References Cited

UNITED STATES PATENTS

| | | | |
|---|---|---|---|
| 3,296,249 | 1/1967 | Bell | 260—239.3 |
| 3,304,313 | 2/1967 | McMillan et al. | 260—239.3 |
| 3,336,296 | 8/1967 | Bell et al. | 260—239.3 |

HENRY R. JILES, Primary Examiner

R. T. BOND, Assistant Examiner

U.S. Cl. X.R.

424—244